Patented Jan. 27, 1931

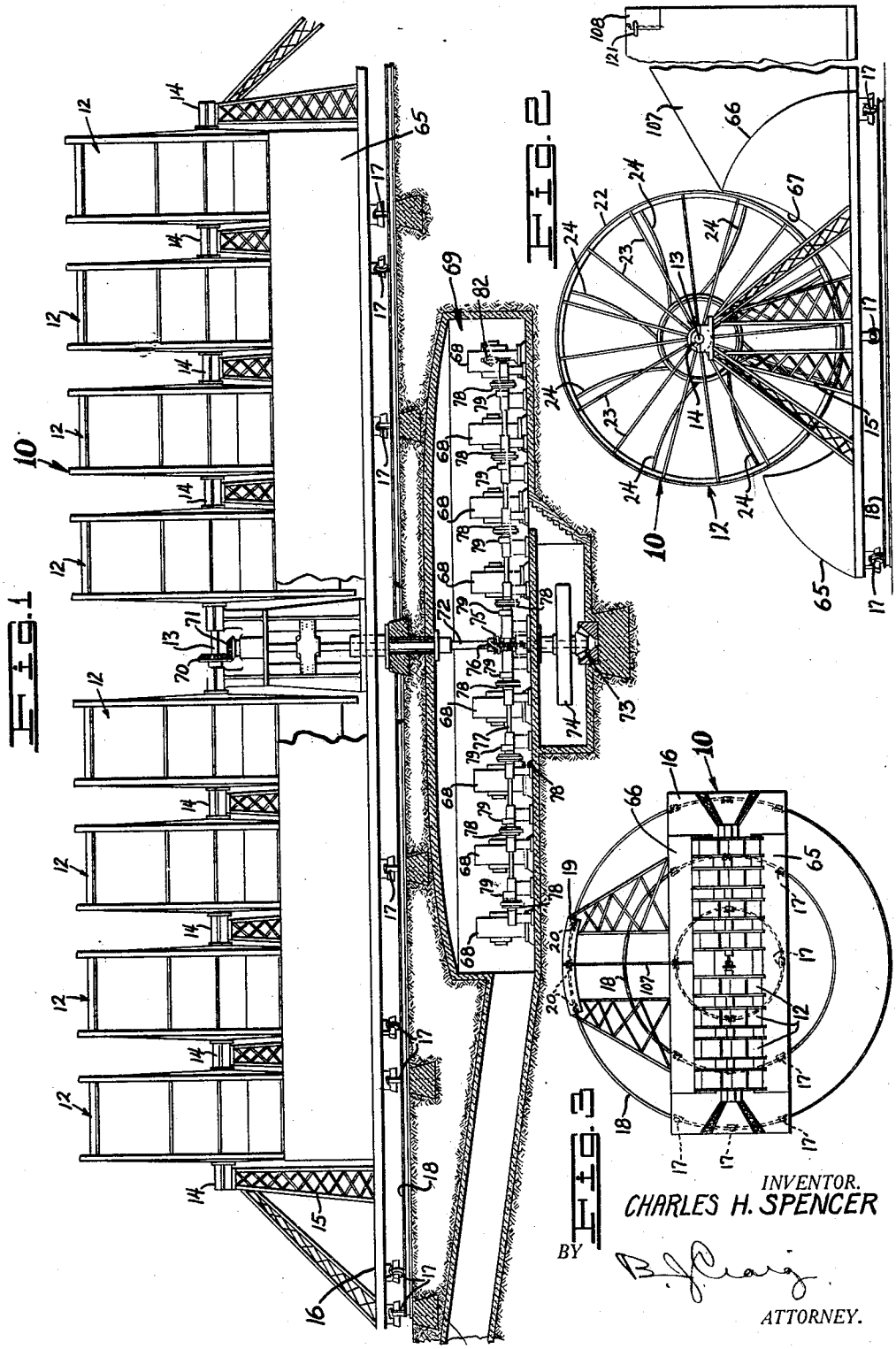

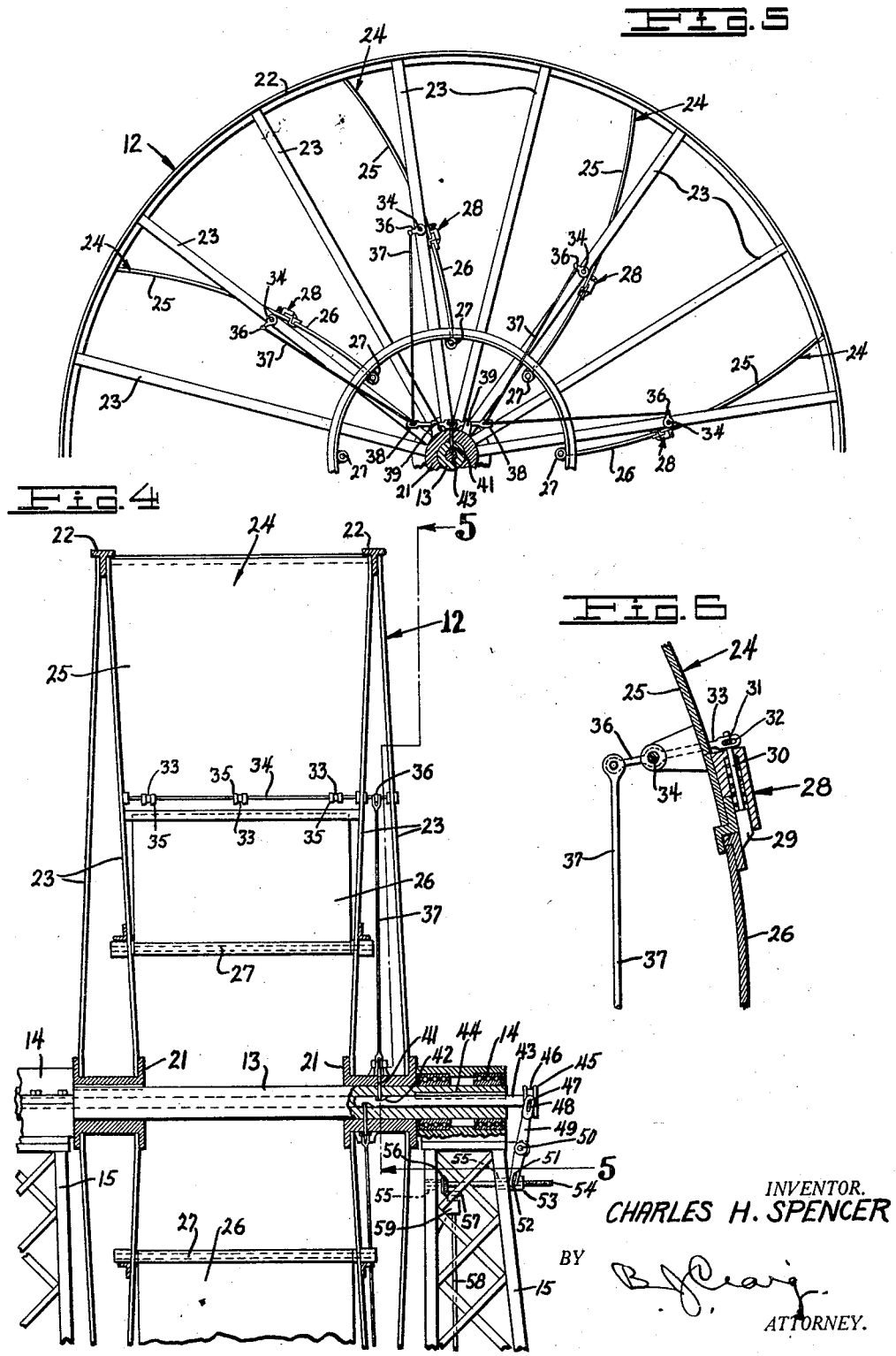

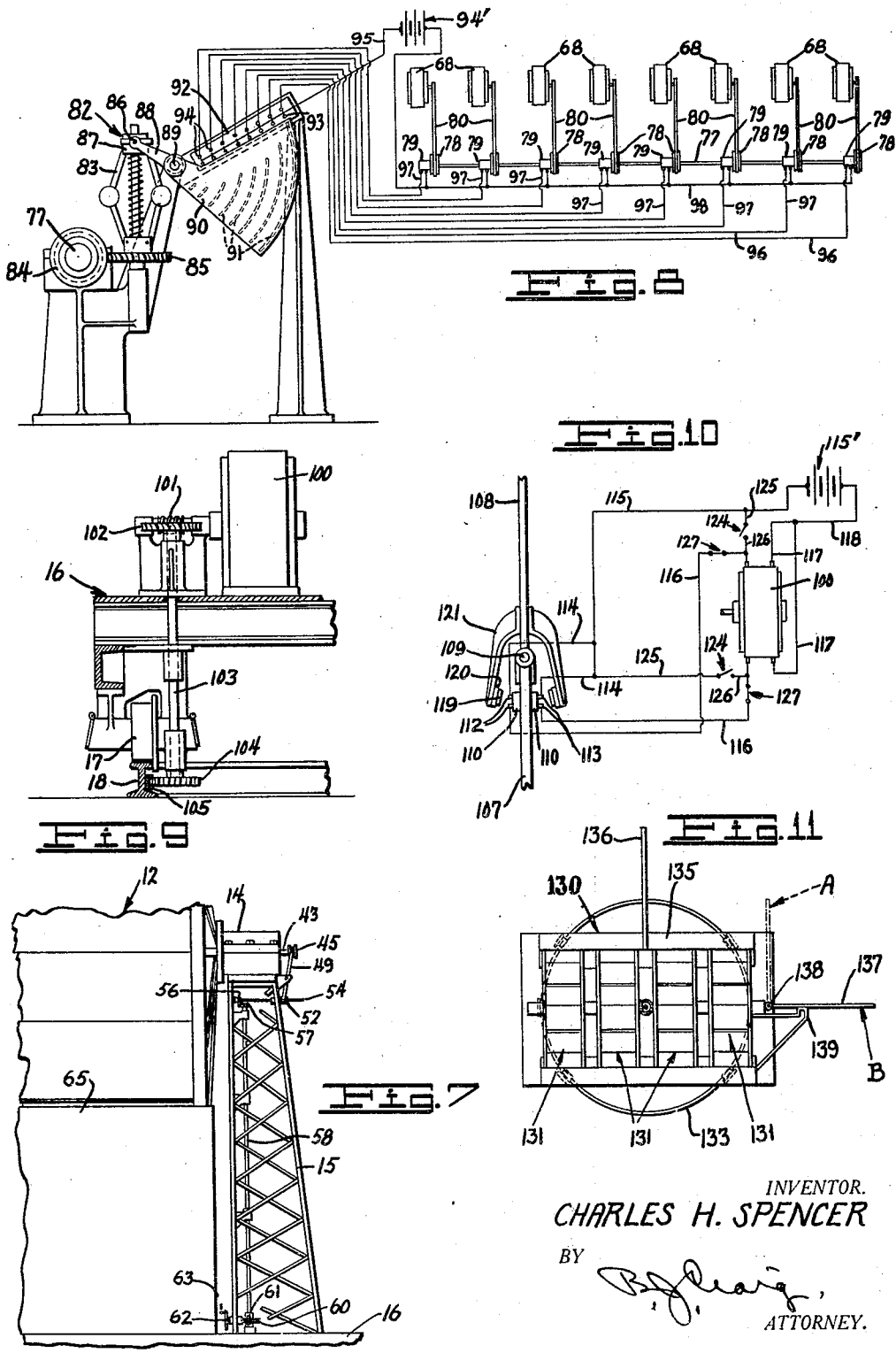

1,790,175

UNITED STATES PATENT OFFICE

CHARLES H. SPENCER, OF LOS ANGELES, CALIFORNIA, ASSIGNOR OF ONE-HALF TO FRANKLIN H. HAMILTON, OF LOS ANGELES, CALIFORNIA

WIND-DRIVEN POWER DEVICE

Application filed September 6, 1928. Serial No. 304,229.

This invention relates to improvements in wind driven devices.

The general object of the invention is to provide an improved wind driven power developing device particularly adapted for manufacture in large sizes for driving electric generators, pumps, compressors, etc.

Another object of the invention is to provide a device of the class described with improved means whereby it will automatically retain its correct position relative to the direction of the wind.

A further object of the invention is to provide a device of the class described wherein means is provided for causing a maximum amount of energy to be derived from the wind.

A still further object of the invention is to provide a device of the class described including a wind device and a power device wherein the speed of the wind driven device controls the actuation of the power device.

Another object of the invention is to provide a device of the class described wherein novel means is provided for varying the surface of the wind driven members exposed to the wind.

Other objects and advantages of this invention will be apparent from the following description taken in connection with the accompanying drawings wherein:

Fig. 1 is a front view of the device partly in section.

Fig. 2 is an end view of the device.

Fig. 3 is a top view of the device on a reduced scale.

Fig. 4 is an enlarged fragmentary longitudinal section through one of the turbine wheels.

Fig. 5 is a section of one of the turbine wheels taken on line 5—5 of Fig. 4.

Fig. 6 is an enlarged fragmentary section through one of the turbine blades showing the latch mechanism of the lower fin.

Fig. 7 is a side elevation of an end support showing the fin latch operating mechanism.

Fig. 8 is an enlarged section taken on line 8—8 of Fig. 1 showing the cut-out switch and showing diagrammatically the electrical connections between the cut-out switch and the electric clutches.

Fig. 9 is an enlarged fragmentary section through the turntable showing the manner of driving the turntable and Fig. 10 is an enlarged fragmentary top plan view of the weather vane showing the automatic switch for starting the turntable driving motor and showing diagrammatically the electrical connections between the switch and the driving motor.

Fig. 11 is a top plan view of a smaller size wind turbine device.

Referring to the drawings by reference characters I have indicated my improved device generally at 10 (Fig. 1). As shown this device comprises a plurality of wind turbine wheels 12 secured to a hollow shaft 13 which is supported in suitable anti-friction bearings 14 as shown in Fig. 4 which are mounted on supports 15.

The supports 15 are mounted on a turntable 16 supported by a plurality of wheels 17 which are adapted to operate on concentric tracks 18. The turntable 16 may be provided with a tail piece 19 (Fig. 3) having wheels 20 thereon and positioned in the rear of the device to brace it against the force of the wind.

As shown each of the turbine wheels 12 is made of metal and includes spaced hubs 21 (Fig. 4) keyed to the shaft 13 and connected to spaced rims 22 by a plurality of curved spokes 23. Each turbine wheel includes a plurality of blades 24 and each blade is divided into two portions 25 and 26. The blade portion 25 is fixed relative to the wheel while the portion 26 is pivoted at its center edge to the wheel as indicated at 27 and is adapted to be normally retained in engagement with the fixed portion 25 by a plurality of latch mechanisms indicated at 28 and clearly shown in Fig. 6.

As shown each of these latch mechanisms is mounted on the fixed blade portion 25 and includes a spring pressed plunger 29 which is adapted to engage the free edge of the pivoted blade portion 26, and a shank 30. The shank 30 is provided with a pin 31 which is adapted to be positioned in a slot 32 of an arm 33 which extends through the blade and is secured to a shaft 34 mounted in bearings 35 on the fixed blade portion and on the spokes 23.

For rotating each of the shafts 34, I provide an arm 36 and connect two arms 36 by rods 37 to a lever 38 which is pivoted to the wheel hubs 21 as at 39. Each two adjacent levers 38 are pivotally connected adjacent their center ends as indicated at 40 to a plunger 41 which extends through the hub 21 and is adapted to be positioned in a notch 42 on a shaft 43 mounted in the hollow shaft 13 as clearly shown in Fig. 4.

The shaft 43 is preferably secured to the shaft 13 by a spline 44 so that it is rotatable with the shaft 43 and movable longitudinally independent of the shaft 43.

The notches 42 include an inclined surface which when the shaft is moved lengthwise in one direction forces the plungers 41 upward which in turn rocks the levers 38 and through the medium of the rods 37 move the arms 36 centerwards. As the arms 36 are thus moved they rock the shaft 34 thereby moving the arms 33 to pull the plunger 29 out of engagement with the edge of the pivoted blade portions which are then free to swing downwardly and spill the air. In this manner the working surface of the blades 24 may be reduced when the wind pressure becomes excessive.

When it is desired to reset the pivoted blade portions the shaft 43 is moved lengthwise in the opposite direction to that mentioned above so that the plungers 41 may again enter the notches 42 and as the blades come to a position on the under side of the wheels the blade portions 26 swing to their normal position and automatically latch themselves in place.

For moving the shaft 43 a pair of spaced flanges 45 are provided on the shaft 43 between which is positioned a collar 46 having oppositely disposed pins thereon as indicated at 47. These pins are positioned in a slot 48 adjacent one end of an arm 49 which is pivoted intermediate its length to one of the supports 15 as indicated at 50 and the opposite end of the arm 49 is provided with a slot 51 in which a pin 52 on a collar 53 is positioned.

The collar 52 is internally threaded and positioned on a threaded shaft 54 which is mounted in bearings 55 on the support 15. Secured to the shaft 54, I provide a bevel gear 56 which meshes with a bevel gear 57 on a vertical shaft 58 which is mounted in bearings 59 on the support 15. Adjacent the lower end of the shaft 58, I provide a worm wheel 60 which is adapted to mesh with a worm 61 on a shaft 62 to which a hand wheel 63 is secured.

When it is desired to move the shaft 43 to actuate the latch mechanism 28 an operator rotates the hand wheel 63 in the correct direction which in turn, through the medium of the worm 61, worm wheel 60, shaft 58 and bevel gears 57 and 56, rotates the threaded shaft 54. As the threaded shaft 54 rotates it moves the collar 53 therealong thereby rocking the arm 49 which in turn moves the shaft 43 in one direction or the other.

For directing the wind so that it will strike the blades 28 at the most advantageous angle, I provide a deflector 65 on the turntable 16 in front of the turbine wheels 12. The front surface of this guard is so shaped that it directs the wind from the lower portion of the device upward thereby exerting an upward thrust on the blades 28 as they move upwardly on their front travel. The curvature of the blades 28 is such that as a blade passes out from behind the deflector 65 the wind will not strike the upper surface of the blade but will immediately strike the under surface of the blade, thereby immediately exerting a working force on the blade.

A second deflector 66 is positioned on the turntable in the rear of the turbine wheels 12 and includes a front curved surface 67. This deflector is preferably higher than the deflector 65 and the front face 67 is so shaped that the wind which blows through the turbine wheels 12 is deflected downward against the blades 28 as they travel downward at the rear of the wheels, thus the wind exerts a force on the blades 28 on their upward, rearward and downward travel, thereby greatly increasing the driving power of the turbine wheels 12.

As shown in Fig. 1 the wind operated device 10 is mounted on the surface of the ground and is adapted to operate electric generators 68 in a power house 69 which may be positioned below the surface of the ground directly under the device 10. For transmitting power from the device 10 to operate the generators 68, I have shown a bevel gear 70 secured to the shaft 13 adjacent the center of the device which is adapted to mesh with a bevel gear 71 on a shaft 72 which is positioned at the axis of rotation of the turntable 16.

The shaft 72 extends downward into the power house 69 and its lower end is preferably supported in a roller thrust bearing as indicated at 73. A flywheel 74 is preferably secured to the shaft 72 just above the bearing 73. A worm 75 is secured to the shaft 72 and is adapted to govern the number of generators to be operated. This device comprises a governor ball 83 which is shown as adapted to be driven from the line shaft 77 through the medium of a worm 84 and a worm wheel 85.

Slackly connected, as indicated at 86, to the movable collar 87 of the governor ball 83, I provide an arm 88 pivoted as at 89 and having secured thereto an insulated arcuate member 90. Mounted on the member 90, I provide a plurality of contact bars 91 of different lengths and corresponding in number to the number of generators 68. Mounted on an insulated plate 92 adjacent the member 90, I provide a plurality of sets of contacts 93 and 94. Each contact 93 of each set is shown as connected to one side of a source of electricity 94' by a wire 95 and each contact 94 of each set is connected by a wire 96 to one terminal of its corresponding electric clutch 79. The other terminal of the electric clutches are connected by wires 97 and 98 to the other side of the source of electricity 94'.

When the turbine wheels 12 are idle the parts are so arranged that the member 90 is in a position where none of the contacts 93 and 94 are bridged by the contact bars 91 but as the turbine wheels begin to operate and drive the line shaft 77 at sufficient speed to operate one generator the governor 83 will move the member 90 so that one set of contacts 93 and 94 are bridged by a contact bar 91, thereby operating the corresponding clutch 79 whereupon the line shaft 77 drives the corresponding pulley 78 and through the medium of the belt 80 the generator 68. As the speed of the line shaft increases sufficiently each set of contacts 93 and 94 is bridged by a contact bar 91 in succession thereby operating the electric clutches to cause the generators to be driven successively in proportion to the speed of the turbine wheels 12.

As the force of the wind decreases and consequently the speed of the turbine wheels 12 and the line shaft 77 the governor ball 83 operates the member 90 to cut out the generators successively in proportion to the speed of the turbines 12.

For moving the turntable 16 so as to maintain the front of the device towards the wind I have shown in Fig. 9 an electric motor 100 mounted on the turntable and adapted to drive a worm gear 101. The worm gear 101 is adapted to mesh with a worm wheel 102 on a vertical shaft 103 to which a gear 104 is secured which is adapted to mesh with a rack 105 secured to the inner side of the outer rail 18.

For operating the motor 100 to automatically maintain the front of the device 10 towards the wind I provide a fin 107 extending from the rear of the device and having a rudder 108 pivoted thereto as indicated at 109 and clearly shown in Fig. 10. Mounted on an insulated block 110 on each side of the fin 107, I provide a set of contacts 112 and 113. One contact of each set is shown as connected by a wire 114 to a wire 115 from one side of a source of power 115' and the other contact of each set is connected by a wire 116 to opposite field contacts on the motor 100. The return field contacts on the motor 100 are each connected by a wire 117 to a wire 118 from the other side of the source of power 115'.

For bridging each set of contacts 112 and 113, I provide contact bars 119 mounted on an insulated member 120 secured to arms 121 which are secured to the rudder 108.

As the wind shifts, the rudder 108 is moved relative to the fin 107 thereby causing one of the contact bars 119 to bridge either the set of contacts 112 or 113, depending on which way the rudder has moved. As a set of contacts is bridged the circuit is closed between the source of power on the side of the motor 100 to which that particular set of contacts is wired and the motor operates to drive the worm gear 101, worm wheel 102, shaft 103 and gear 104, whereupon the turntable 16 will be moved to bring the front of the device 10 into the wind. When the device 10 has been brought directly into the wind the rudder 108 will be moved to align with the fin 107 and the contact bar 119 will be moved away from the set of corresponding contacts thereby breaking the circuit to the motor 100.

For operating the motor 100 irrespective of the direction of the wind switches 124 may be provided to shunt the current through wires 125 and 126 from the wires 115 to the wire 116. Switches 127 may also be provided to break the circuit in the wires 116. Thus by opening both of the switches 127 either one or the other of the switches 125 may be closed to cause the motor 100 to operate and even though the rudder moves to bridge the sets of contacts it will not affect the motor.

The fin 107 will, if the wind is sufficiently strong, help move the turntable and may be used as the sole means for turning and maintaining the device in correct relation to the wind when the devices are built on a smaller scale. The size of the fin 107 may be varied to suit the requirements of each installation.

The device 10 as I have shown and described it is adapted for producing a great amount of power and may be made in a size some two hundred feet in length with sixty foot turbine wheels, but of course it will be understood that the device may be made on a smaller scale to produce less power and may even be made larger to produce greater power and although as I have shown and described the device it is particularly adapted to furnish power to drive electric generators it will be understood that the power developed by the device may be utilized for any desired purpose.

The guards or deflectors 65 and 66 may be made in the form of tanks which may be filled with water to act as ballast for the device when the velocity of the wind is high.

In Fig. 11, I have shown my invention embodied in a small sized device indicated generally at 130. This device is similar in all respects to the large device 10 and includes a plurality of wind turbine wheels 131 mounted on a turntable 132 which is adapted to operate on a circular track 133. Wind deflectors 134 and 135 similar to the deflectors 65 and 66 are provided and a tail fin 136 adapted to retain the front of the device towards the wind is provided. To assist in turning the device when the wind shifts I provide an end fin 137. This fin is pivoted as indicated at 138 and is free to swing from an idle rearward position as indicated at A to a working position as indicated at B, against a stop 139. When the device is fronting the wind the side fin 137 points toward the rear as indicated at A, but as the wind shifts toward the rear of the device the wind swings the fin 137 outward as indicated at B. The wind pressure against the fin 137 at the position B and against the fin 136 will rotate the device towards a new frontal position.

From the foregoing description it will be apparent that I have provided an improved wind power device which is simple in construction and highly efficient in use.

Having thus described my invention, I claim:

1. In a device of the class described, a shaft, a wind wheel mounted on said shaft, said wheel including a plurality of blades, certain of said blades comprising an outer fixed portion and an inner portion pivoted adjacent its centerward edge.

2. In a wind power device, a shaft, a wind turbine wheel mounted on said shaft, said wheel including a plurality of blades, each of said blades comprising an outer fixed portion and an inner portion pivoted adjacent its centerward edge and a plurality of latch mechanisms adapted to normally retain said pivoted blade portion in alignment with said fixed blade portion.

3. In a device of the class described, a plurality of wind turbine wheels, a plurality of blades carried by said wheels, each of said blades comprising an outer fixed portion and an inner portion pivoted adjacent its centerward edge, a plurality of latch mechanisms adapted to normally retain said pivoted blade portion in alignment with said fixed blade portion, a plurality of plungers in one of said wheels and means connecting each of said plungers to said latch mechanisms on a plurality of said blades whereby when said plungers are moved outwardly from the center said latch mechanisms will be actuated to release said pivoted blade portions.

4. In a device of the class described, a circular track, a turntable mounted thereon having wheels engaging said track, supports mounted on said turntable, a hollow horizontal shaft mounted in bearings carried by said supports, a plurality of wind turbine wheels mounted on said shaft, each of said wheels having a pair of spaced hubs secured to said shaft and connected to a pair of spaced rims by a plurality of spokes, a plurality of blades carried by said wheels between said spokes, each of said blades comprising an outer fixed portion and an inner portion pivoted adjacent its inner edge, a plurality of latch mechanisms adapted to normally retain said pivoted blade portion in alignment with said fixed blade portion, a plurality of plungers in one of said wheel hubs, means connecting each of said plungers to said latch mechanisms on a plurality of said blades whereby when said plungers are moved outwardly from the center said latch mechanism will be actuated to release said pivoted blade portions, a shaft slidable in said horizontal shaft, and rotatable with said horizontal shaft, means on said second shaft coacting with said plungers whereby when said second shaft is moved horizontally in one direction it will actuate said plungers to release said latch mechanisms and when moved in the opposite direction will reset said latch mechanisms whereupon said pivoted blade members will automatically reset themselves, means connecting said second shaft and means adjacent said turntable whereby said second shaft can be operated by an operator on said turntable.

In testimony whereof, I hereunto affix my signature.

CHARLES H. SPENCER.